(12) United States Patent
Christensen et al.

(10) Patent No.: US 7,051,512 B2
(45) Date of Patent: May 30, 2006

(54) FLUIDIC DIVERTER VALVE WITH A VARIABLE VALVE-BORE CLEARANCE

(75) Inventors: Donald J. Christensen, Phoenix, AZ (US); Stephen G. Abel, Chanlder, AZ (US)

(73) Assignee: Honeywell International, Inc., Morristown, NJ (US)

( * ) Notice: Subject to any disclaimer, the term of this patent is extended or adjusted under 35 U.S.C. 154(b) by 143 days.

(21) Appl. No.: 10/732,932

(22) Filed: Dec. 10, 2003

(65) Prior Publication Data

US 2005/0150207 A1     Jul. 14, 2005

(51) Int. Cl.
*F15C 1/04*     (2006.01)
(52) U.S. Cl. ................ 60/229; 137/832; 137/872; 239/265.29
(58) Field of Classification Search ........... 60/229, 60/242; 239/265.29; 137/832, 861, 972, 137/831, 821
See application file for complete search history.

(56) References Cited

U.S. PATENT DOCUMENTS

| | | | |
|---|---|---|---|
| 720,100 A | 2/1903 | Bashlin | |
| 3,055,391 A | 9/1962 | Shuk et al. | |
| 3,486,517 A | 12/1969 | Gaura | |
| 3,498,315 A | 3/1970 | Graves et al. | |
| 3,520,479 A | 7/1970 | Jacquin et al. | |
| 3,521,653 A | 7/1970 | Becker et al. | |
| 3,724,496 A | 4/1973 | Secrist | |
| 3,900,230 A | 8/1975 | Durling | |
| 3,949,774 A | 4/1976 | Morrow | |
| 5,141,025 A | 8/1992 | Eichhorn et al. | |
| 5,337,783 A | 8/1994 | Rott | |
| 5,711,347 A | 1/1998 | Sturman et al. | |
| 5,860,791 A | 1/1999 | Kikuchi | |
| 5,927,335 A | 7/1999 | Christensen | |

*Primary Examiner*—Ehud Gartenberg
(74) *Attorney, Agent, or Firm*—Ingrassia Fisher & Lorenz

(57) ABSTRACT

A fluidic diverter valve includes valve element freely disposed within a valve bore. The valve bore has a cross sectional area that varies. As a result, the clearance between the valve element and an inner surface of the valve bore also varies. This variation in cross sectional area, and thus clearance, is such that a force of sufficient magnitude to move the valve element from a seated position is initially applied to the valve element, but the force on the valve element is reduced once it is moved from the seated position. Thus, the impact force upon attaining another seated position is reduced.

23 Claims, 3 Drawing Sheets

FLUIDIC DIVERTER VALVE WITH A VARIABLE VALVE-BORE CLEARANCE

FIELD OF THE INVENTION

The present invention relates to hot gas fluidic diverter valves used in missile and spacecraft propulsion systems and, more particularly, to a hot gas fluidic diverter valve having a valve bore that provides a variable clearance between the valve bore and the valve element.

BACKGROUND OF THE INVENTION

The movements involved in flight of some missiles and space vehicles, such as pitch, yaw, and spin rate, are controlled with flight control systems that use reaction jets. In some systems of this type, a pressurized gas source, such as a gas generator, supplies a pressurized gas to one or more fluidic amplifier stages. In response to a control signal supplied from flight control equipment, a fluidic amplifier stage can selectively divert the pressurized gas into one of two or more flow paths. Each flow path may have a nozzle on its outlet that is located external to the missile or vehicle. These nozzles may be positioned to provide thrust in different or opposite directions. Thus, the fluidic amplifier stages can affect one or more flight parameters by selectively diverting the pressurized gas to selected outlet nozzles.

The fluidic amplifier stages incorporated into the above-described flight control system can include non-vented fluidic amplifiers, which are generally known in the art. However, non-vented fluidic amplifiers may not provide 100% flow diversion. Thus, some systems incorporate an additional fluidic element, such as a fluidic diverter valve, between the final fluidic amplifier stage and the output nozzles, which allows the system to substantially achieve 100% flow diversion.

One particular type of fluidic diverter valve uses a spherically shaped ball valve element. The ball element is solid, and is located in a chamber formed in the valve housing. The housing includes an inlet port and two outlet ports. The ball element is moveable within the chamber and selectively blocks one of the two ports so that pressurized gas entering the inlet port is selectively directed out the port that is not blocked. For high-temperature applications, such as those that may be encountered in missile and spacecraft propulsion systems, refractory metals, such as rhenium, and carbon-based materials, such as graphite, may be used to construct the valve element. In some cases, rhenium coated graphite valve elements are used.

Although the above-described type of fluidic diverter valve is robustly designed and manufactured, and operates safely, it suffers certain drawbacks. For example, the impact load experienced by the valve element during operation can cause cracks in the rhenium coating, which can adversely impact system performance, shorten valve element lifetime, and/or increase overall system costs.

Hence, there is a need for a fluidic diverter valve that addresses one or more of the above-noted drawbacks. Namely, a hot gas fluidic diverter valve having a valve element that experiences reduced impact loading during operation, and thus does not adversely impact system performance, and/or does not shorten valve element lifetime, and/or does not increase overall system cost. The present invention addresses one or more of these needs.

SUMMARY OF THE INVENTION

The present invention provides a hot gas fluidic diverter valve with a variable valve-bore clearance. The variable valve-bore clearance reduces the impact loading during valve operations, and thus increases valve element lifetime, as compared to present fluidic diverter valves.

In one embodiment, and by way of example only, a hot gas fluidic diverter valve includes a housing, a first fluid inlet port, a second fluid inlet port, a first fluid outlet port, a second fluid outlet port, and a valve element. The housing has a valve bore formed therein, that includes a first end and a second end. The first fluid inlet port extends through the housing and is in fluid communication with the valve bore. The second fluid inlet port extends through the housing and is in fluid communication with the valve bore. The first fluid outlet port extends through the housing and is in fluid communication with the valve bore. The second fluid outlet port extends through the housing and is in fluid communication with the valve bore. The valve element is freely disposed within the valve bore and is translationally moveable between at least a first position, in which the valve element substantially seals the first fluid outlet port, and a second position, in which the valve element substantially seals the second fluid outlet port. The valve bore first and second ends each have a first cross sectional area, and at least a section of the valve bore inner surface between the valve bore first and second ends has a second cross sectional area that is greater than the first cross sectional area.

In another exemplary embodiment, a flow control device for use with a hot gas generator having a pressure vessel and providing a combustion gas output includes a fluidic amplifier, and a fluidic diverter valve. The fluidic amplifier has a fluid inlet port and at least two fluid outlet ports. The fluid inlet port is adapted to receive hot pressurized fluid from the gas generator pressure vessel. The fluidic diverter valve includes a housing, a first fluid inlet port, a second fluid inlet port, a first fluid outlet port, a second fluid outlet port, and a valve element. The housing has a valve bore formed therein, that includes a first end and a second end. The first fluid inlet port extends through the housing and couples a first one of the fluidic amplifier fluid outlet ports in fluid communication with the valve bore. The second fluid inlet port extends through the housing and couples a second one of the fluidic amplifier fluid outlet ports in fluid communication with the valve bore. The fluidic diverter valve first fluid outlet port extends through the housing and is in fluid communication with the valve bore. The fluid diverter valve second fluid outlet port extends through the housing and is in fluid communication with the valve bore. The valve element is freely disposed within the valve bore and is translationally moveable between at least a first position, in which the valve element substantially seals the fluidic diverter valve first fluid outlet port, and a second position, in which the valve element substantially seals the fluidic diverter valve second fluid outlet port. The valve bore first and second ends each have a first cross sectional area, and at least a section of the valve bore inner surface between the valve bore first and second ends has a second cross sectional area that is greater than the first cross sectional area.

In yet another exemplary embodiment, a flight control system includes a controller a hot gas generator, one or more fluidic amplifier stages, at least two discharge nozzles, and a fluidic diverter valve. The controller is operable to supply flight control signals. The hot gas generator is operable to supply a flow of hot pressurized gas. The fluidic amplifier stages are coupled to receive the flow of hot pressurized gas from the gas generator and are responsive to the flight control signals to selectively divert at least a portion of the received flow of hot pressurized gas into one of at least two amplifier stage outlet ports. The fluidic diverter valve includes a housing, a first fluid inlet port, a second fluid inlet port, a first fluid outlet port, a second fluid outlet port, and a valve element. The housing has a valve bore formed therein, that includes a first end and a second end. The first fluid inlet port extends through the housing and couples a first one of the fluidic amplifier fluid outlet ports in fluid communication with the valve bore. The second fluid inlet port extends through the housing and couples a second one of the fluidic amplifier fluid outlet ports in fluid communication with the valve bore. The fluidic diverter valve first fluid outlet port extends through the housing and couples a first one of the discharge nozzles in fluid communication with the valve bore. The fluid diverter valve second fluid outlet port extends through the housing and couples a second one of the discharge nozzles in fluid communication with the valve bore. The valve element is freely disposed within the valve bore and is translationally moveable between at least a first position, in which the valve element substantially seals the fluidic diverter valve first fluid outlet port, and a second position, in which the valve element substantially seals the fluidic diverter valve second fluid outlet port. The valve bore first and second ends each have a first cross sectional area, and at least a section of the valve bore inner surface between the valve bore first and second ends has a second cross sectional area that is greater than the first cross sectional area.

Other independent features and advantages of the preferred fluidic diverter valve will become apparent from the following detailed description, taken in conjunction with the accompanying drawings which illustrate, by way of example, the principles of the invention.

DETAILED DESCRIPTION OF A PREFERRED EMBODIMENT

Figure 1:
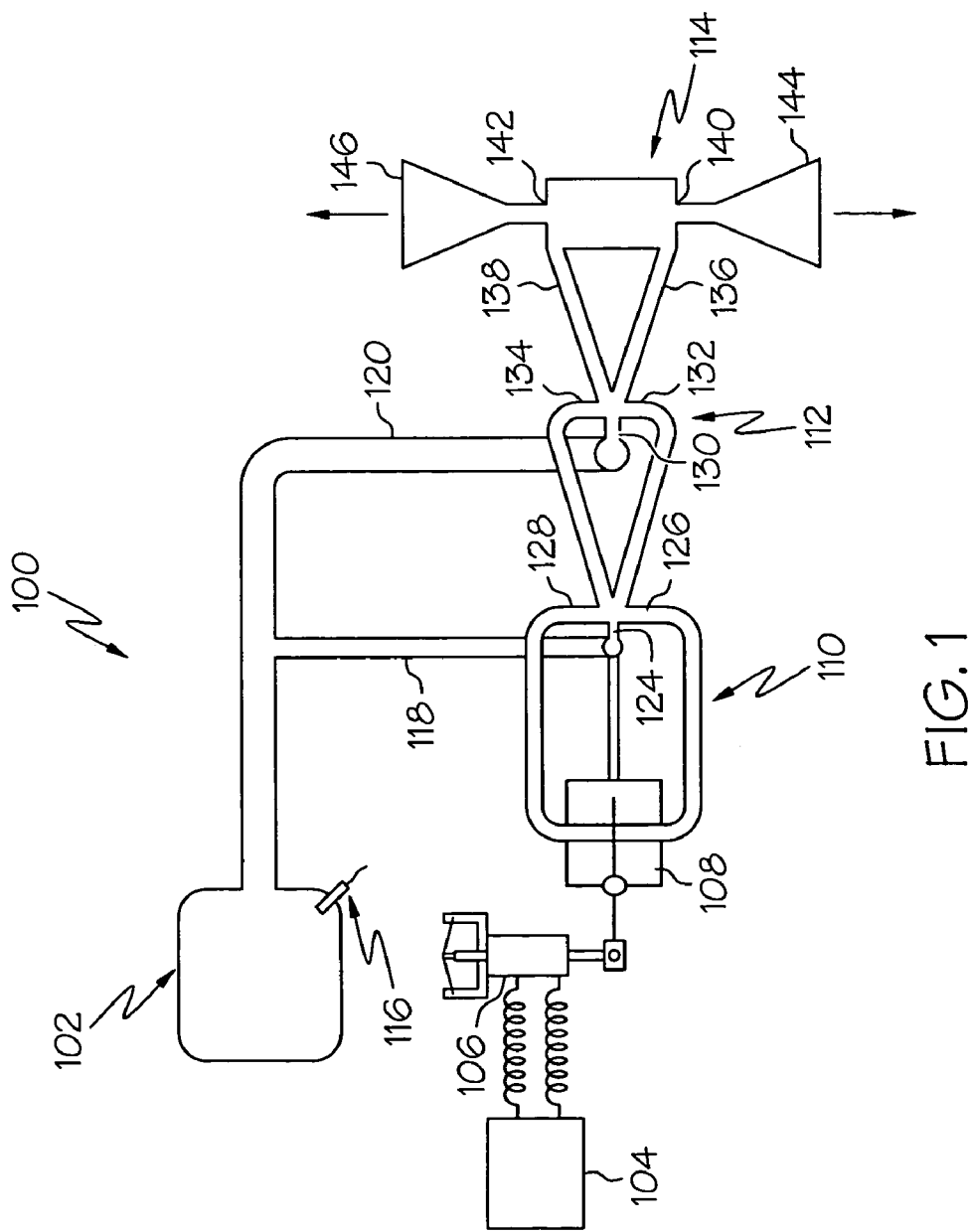
FIG. 1 is a simplified schematic diagram of an exemplary flight control system that may use an embodiment of the present invention.

A simplified schematic diagram of at least a portion of an exemplary flight control system 100 that may use an embodiment of the present invention is illustrated in FIG. 1. The system 100 includes a gas generator 102, a flight controller 104, a solenoid valve 106, a pilot valve 108, a first stage fluidic amplifier 110, a second state fluidic amplifier 112, and a fluidic diverter valve 114. The gas generator 102 includes initiators 116 that, during a vehicle launch sequence or at some point during vehicle flight, activates the gas generator 102. The gas generator 102, upon activation, supplies a flow of high pressure, high temperature gas to one or more gas flow paths. In the depicted embodiment, a first gas flow path 118 is fluidly coupled to the first stage fluidic amplifier 110 and to the pilot valve 108, and a second gas flow path 120 is fluidly coupled to the second stage fluidic amplifier 112.

The first 110 and second 112 stage fluidic amplifiers are each preferably non-vented fluidic bistable amplifiers. The first stage fluidic amplifier 110 includes a primary gas flow path 124, and two control gas flow paths, namely a first control gas flow path 126 and a second control gas flow path 128. Similarly, the second stage fluidic amplifier 112 includes a primary gas flow path 130, a first control gas flow path 132, and a second control gas flow path 134. The second stage fluidic amplifier 112 additionally includes two outlet ports, a first fluid outlet port 136 and a second fluid outlet port 138.

The first stage fluidic amplifier primary gas flow path 124 is in fluid communication with the first gas flow path 118 from the gas generator 102, and the second stage fluidic amplifier primary gas flow path 130 is in fluid communication with the second gas flow path 120 from the gas generator 102. The first stage fluidic amplifier first 126 and second 128 control gas flow paths are in fluid communication with the pilot valve 108, and the second stage fluidic amplifier first 132 and second 134 control gas flow paths are in fluid communication with the first stage fluidic amplifier primary 124 gas flow path 124 and the first 126 and second 128 control gas flow paths. The second stage fluidic amplifier first 136 and second 138 fluid outlet ports are in fluid communication with the fluidic diverter valve 114.

Figure 2:
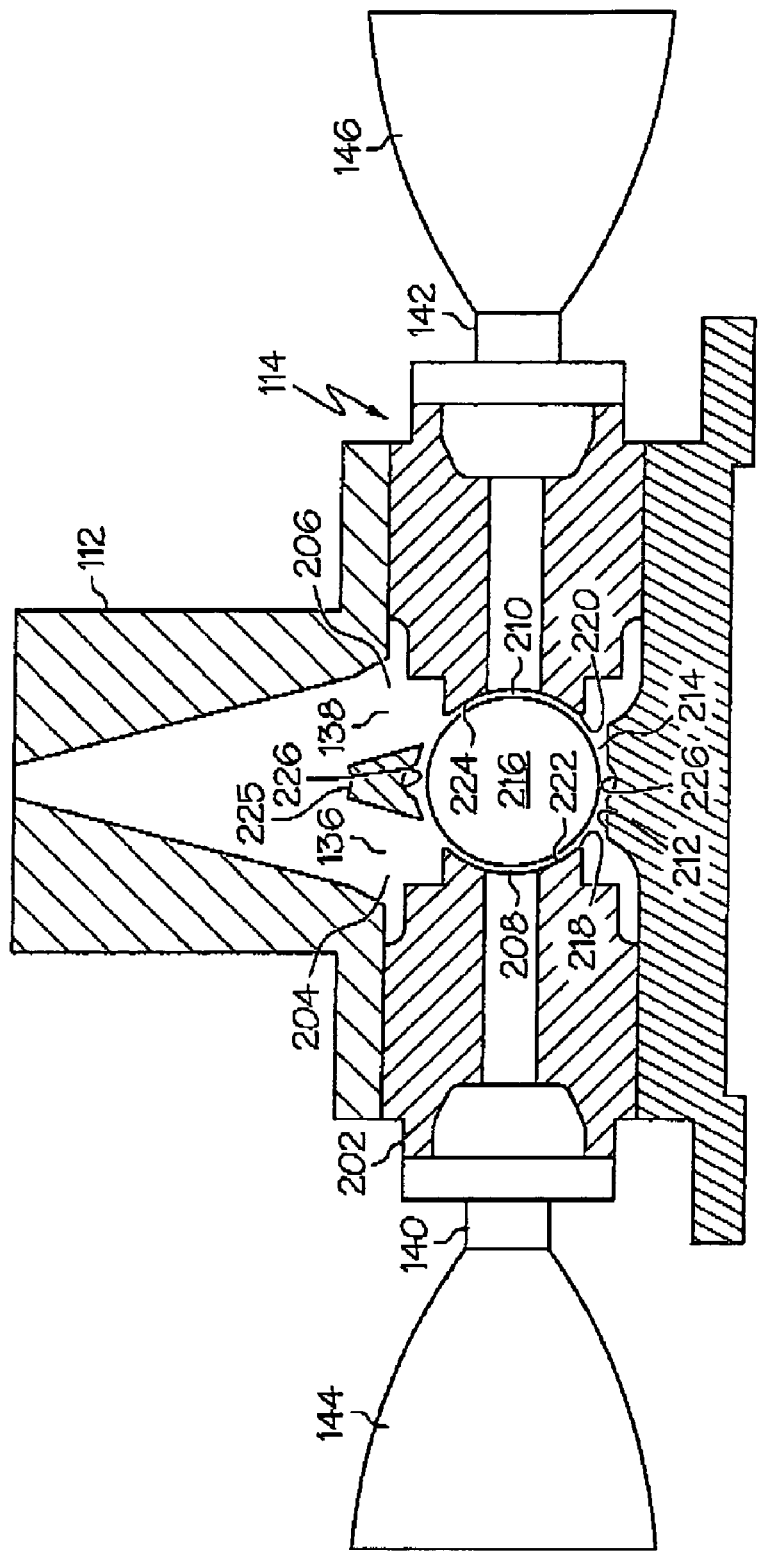
FIG. 2 is a cross section view of a portion of the flight control system of FIG. 1, showing an exemplary fluidic diverter valve according to an exemplary embodiment of the present invention.

The fluidic diverter valve 114, one embodiment of which is shown in cross section in FIG. 2, is mounted to the second stage fluidic amplifier 112. In the depicted embodiment, the fluidic diverter valve 114 is mounted within the second stage fluidic amplifier 112, though it will be appreciated that the fluidic diverter valve 114 could be mounted on the second stage fluidic amplifier 112. As FIGS. 1 and 2 illustrate, the fluidic diverter valve 114 includes a housing 202, at least two fluid inlet ports, a first fluid inlet port 204 and a second fluid inlet port 206, and at least two fluid outlet ports, a first fluid outlet port 208 and a second fluid outlet port 210. It will be appreciated that the configuration of the first 204 and second 206 fluid inlet ports is not limited to that depicted in FIG. 2. Moreover, the housing 202 may be formed from two or more separate sections or as an integral piece. In either case, an inner surface 212 of the housing 202 defines a valve bore 214 that is preferably, though not necessarily, cylindrically shaped, and in which a valve element 216 is freely disposed. The valve element 216 is preferably, though not necessarily, spherically shaped, and is translationally moveable within the valve bore 214 between the first 208 and second 210 fluid outlet ports.

As FIG. 2 additionally shows, the valve bore 214 includes a first end 218 and a second end 220. In the depicted embodiment, a first valve seat 222 is formed in the valve bore first end 218, and a second valve seat 224 is formed in the valve bore second end 220. The first 222 and second 224 valve seats are each preferably shaped and dimensioned to allow the valve element 216 to seat against it, and seal the respective fluid outlet ports 208, 210. The valve seats 222, 224 are also shaped and dimensioned to provide a relatively small clearance between the valve element 216 and the valve bore 214, when the valve element 216 is positioned proximate each of the valve seats 222, 224. It should be appreciated that the diverter valve 114 could be implemented without the valve seats 222, 224, and that the valve seats 222, 224 could be configured differently.

The valve bore 214 and valve element 216 are each configured so that the clearance between the valve bore 214 and valve element 216 varies between the valve bore first 218 and second 220 ends. Although this variable clearance could be implemented in any one of numerous ways, with reference now to FIG. 3, it is seen that in the depicted embodiment the valve bore first 218 and second 220 ends each have a maximum cross sectional area ($A_1, A_2$), whereas the valve bore between the first 218 and second 220 ends has a maximum cross sectional area ($A_{bore}$). The valve bore 214 between the first 218 and second 220 ends could gradually increase toward the maximum cross sectional area ($A_{bore}$), or do so in a series of step changes. However, in the depicted embodiment, the change in cross sectional area of the valve bore 214 is implemented by a clearance cut 226 formed in the valve bore 214 between the valve bore first 218 and second 220 ends. The clearance cut 226 is preferably dimensioned and positioned so that the maximum cross sectional area ($A_{bore}$) encompasses all of the valve element stroke between the valve bore first 218 and second 220 ends, with the exception of a small zone adjacent each valve seat 222, 224 and near each valve bore end 218, 220. The reason for this will be discussed in more detail further below. In the depicted embodiment, the clearance cut 226 is formed into the entire perimeter of the valve bore inner surface 212. It will be appreciated, however, that the clearance cut 226 could be formed into only a portion of the inner surface perimeter. In addition, although the clearance cut 226 is depicted as having a circular cross sectional shape, it will be appreciated that this is merely exemplary, and that it could have a square, rectangular, triangular, or any one of numerous other cross sectional shapes.

The fluidic diverter valve first 204 and second 206 fluid inlet ports and first 208 and second 210 fluid outlet ports each extend through the housing, and are each in fluid communication with the valve bore 214. The fluidic diverter valve first 204 and second 206 fluid inlet ports are also in fluid communication with the second stage fluidic amplifier first 136 and second 138 fluid outlet ports, respectively. In addition, the fluidic diverter valve first 208 and second 210 fluid outlet portes are in fluid communication with first 140 and second 142 blast tubes, respectively, which are each in fluid communication with first 144 and second 146 thrust nozzles, respectively. Thus, as will be described more fully below, the valve element 216 is positioned within the valve bore 214 by controlling the flow of fluid such as, for example, hot pressurized gas, through the second stage fluidic amplifier first 136 and second 138 fluid outlet ports.

Referring now to FIGS. 1 and 2 in combination, operation of the flight control system 100 is controlled by the flight controller 104. During vehicle flight, the flight controller 104 supplies control signals to the solenoid valve 106, which in turn causes the pilot valve 108 to divert a portion of the gas flowing in the first flow path 118 into one of the first stage fluidic amplifier control gas flow paths 126 or 128. This causes the gas flowing through the first stage fluidic amplifier primary gas flow path 124 to be directed into one of the second stage fluidic amplifier control gas flow paths 132 or 134. This in turn causes the gas flowing through the second stage fluidic amplifier primary gas flow path 130, which is received from the gas generator second gas flow path 120, to be directed into one of the second stage fluidic amplifier outlet ports 136 or 138, which are formed by an interposed flow splitter 225. As a result, gas flowing through the second stage fluidic amplifier outlet ports 136 or 138 will enter one of the fluidic diverter valve fluid inlet ports 204 or 206. This will cause the valve element 216 to move away from one of the diverter valve fluid outlet ports 208 or 210, and allow gas to flow through it to one of the thrust nozzles 144 or 146. At the same time, the valve element 216 will be moved toward the other fluid outlet port 210 or 208, sealing it and the other thrust nozzle 146 or 144 from the gas flow.

For example, if it is desired to exhaust gas out the first thrust nozzle 144, the flight controller 104 will supply a control signal to solenoid valve 106 that will cause the pilot valve 108 to divert gas flow into the first stage fluidic amplifier first control gas flow path 126. This will direct the gas flowing through the first stage fluidic amplifier primary gas flow path 124 into the second stage fluidic amplifier second control gas flow path 134, which will in turn direct the gas flowing through the second stage fluidic amplifier primary gas flow path 130 into the second stage fluidic amplifier first outlet port 136. The gas then flows through the second stage fluidic amplifier first fluid outlet port 136, and into the fluidic diverter valve first fluid inlet port 204, causing the valve element 216 to move away from the first fluid outlet port 208 and toward the second fluid outlet port 210, as described below.

Figure 3:
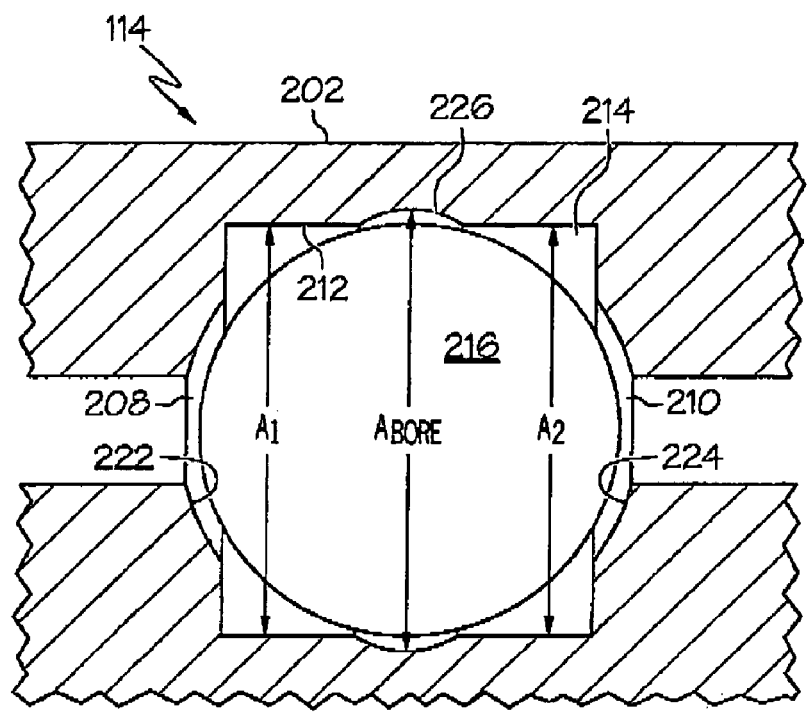
FIGS. 3 and 4 are cross section views of a portion of the fluidic diverter valve shown in FIG. 2 with the valve in a mid-stroke position and an on-seat position, respectively.
Figure 4:
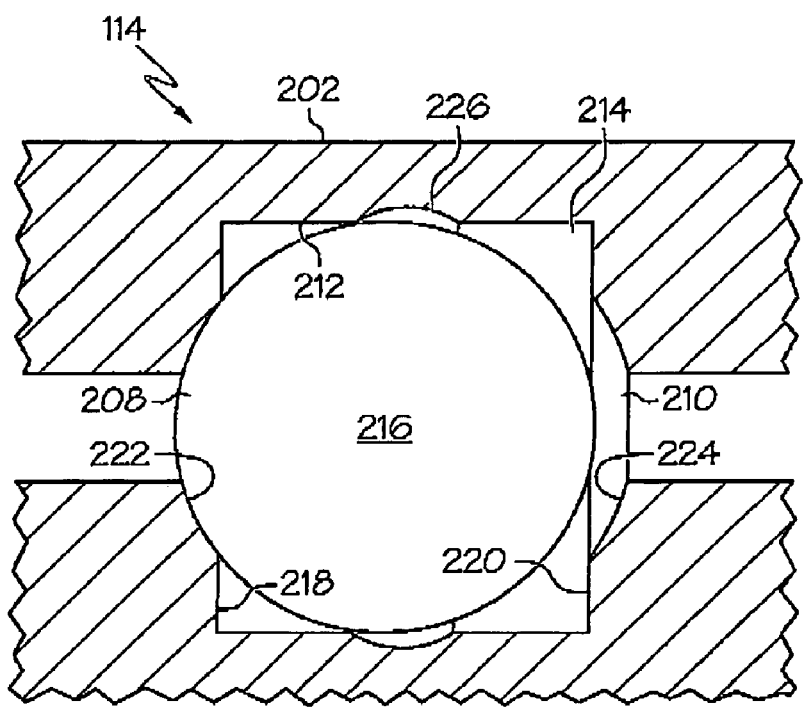

Initially, as shown in FIG. 4, the clearance between the valve element 216 and the valve bore 214 is relatively small, which creates a relatively high force on the valve element 216, which moves the valve element from the first seat 222 and commences its movement toward the valve bore second end 220. This relatively high force also causes the valve element 216 to begin moving at a relatively high velocity. However, as shown in FIG. 3, once the valve element 216 is off the first seat 222 and begins moving, the clearance between the valve bore 214 and valve element 216 increases, due to the clearance cut 226, which reduces the force on the valve element 216 as it moves toward the valve bore second end 220 and the second valve seat 224. Thus, when the valve element 216 seats against the second valve seat 224, and thus seals the second fluid outlet port 210, it will do so with a reduced impact force as compared to presently known valves. With the second fluid outlet port 210 sealed, the second thrust nozzle 146 is also sealed against gas flow, and the pressurized gas flows out the first fluid outlet port 208 and through the first thrust nozzle 144.

The fluidic diverter valve 114 may be constructed of any one of numerous materials that are capable of withstanding the high temperature output of the gas generator 102, and the specific materials used may depend on the temperature of the gas supplied by the gas generator 102. For example, when the flight control system 100 need only supply relatively "warm" gas (e.g., <2000° F.) for relatively short flight profiles (e.g., <1 second), stainless steel may be used for the housing 202 and other non-moving parts of the diverter valve 114. For longer flight profiles, or hotter gas temperatures, the housing 202 and other non-moving parts are preferably constructed of Inconel, ceramic, or TZM (Titanium Zirconium Molybdenum). When the flight control system supplies gas at temperatures in the range of 3700° F., exotic materials such as, for example, rhenium, are preferred because of the high temperature strength and diffusion bonding capability such exotic materials exhibit. Conventional machining operations such as, for example, plunge EDM are suitable for forming the housing 202 and other non-moving parts.

The valve element 216 may also be constructed of any one of numerous materials that are capable of withstanding the high temperature output of the gas generator 102. In a particular preferred embodiment for warm gas applications, the valve element 216 is formed of a pure silicon nitride. For higher temperature applications, the valve element 216 is formed of a ceramic or graphite material, and is then coated with a layer of rhenium by, for example, a chemical vapor deposition (CVD) process.

The fluidic diverter valve 114 includes a valve bore 214 having a cross sectional area that varies. As a result, the clearance between the valve element 216 and the inner surface 212 of the valve bore 214 also varies. The variation in cross sectional area, and thus clearance, is such that the valve element 216 is moved off the valve seats 222, 224 with a high velocity, but the force on the valve element 216 is reduced once it is moved off the seats 222, 224. Thus, the impact force upon seating against the other seat is reduced, and the likelihood of damaging either, or both, the valve element 216 and valve housing 202 is reduced.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A hot gas fluidic diverter valve system, comprising:
a hot gas fluidic diverter valve fluidly connected to at least one fluidic amplifier stage;
a housing having an inner surface that forms a valve bore therein, the valve bore including a first end and a second end;
a first fluid inlet port extending through the housing and in fluid communication with the valve bore;
a second fluid inlet port extending through the housing and in fluid communication with the valve bore;
a first fluid outlet port extending through the housing and in fluid communication with the valve bore first end;
a second fluid outlet port extending through the housing and in fluid communication with the valve bore second end; and
a valve element freely disposed within the valve bore and translationally moveable between at least (i) a first position, in which the valve element substantially seals the first fluid outlet port, and (ii) a second position, in which the valve element substantially seals the second fluid outlet port,
wherein the valve bore first and second ends each have a first cross sectional area, and at least a section of the valve bore between the valve bore first and second ends has a second cross sectional area that is greater than the first cross sectional area;
wherein the second cross-sectional area comprises a clearance cut in a flow splitter.

2. The valve of claim 1, wherein said clearance cut is a groove formed in the valve bore inner surface and at least partially surrounding the valve bore, to thereby form the valve bore inner surface section that has the second cross sectional area.

3. The valve of claim 1, further comprising:
a first seat surface formed in the valve bore first end; and
a second seat surface formed in the valve bore second end,
wherein the valve element seats against the first seat surface when in the first position, and against the second seat surface when in the second position.

4. The valve of claim 3, wherein each seat surface has a maximum cross sectional area that is less than the first cross sectional area.

5. The valve of claim 3, wherein the valve element is substantially sphere-shaped.

6. The valve of claim 5, wherein:
the first and second seat surfaces are at least partially sphere-shaped; and
the valve bore is substantially cylinder-shaped.

7. The valve of claim 1, wherein the first and second fluid outlet ports are positioned substantially opposite one another.

8. The valve of claim 1, wherein the housing comprises a metal selected from the group consisting of Inconel, ceramic, and Titanium Zirconium Molybdenum.

9. The valve of claim 8, wherein the housing further comprises rhenium.

10. The valve of claim 1, wherein the valve element comprises silicon nitride.

11. The valve of claim 1, wherein the valve element comprises graphite coated with a layer of rhenium.

12. A flow control device for use with a hot gas generator having a pressure vessel and providing a combustion gas output, the flow control device comprising:
a fluidic amplifier having a fluid inlet port and at least two fluid outlet ports, the fluid inlet port adapted to receive hot pressurized fluid from the gas generator pressure vessel; and
a fluidic diverter valve fluidly connected to said fluidic amplifier including:
a housing having an inner surface that forms a valve bore therein, the valve bore including a first end and a second end,
a first fluid inlet port extending through the housing and coupling a first one of the fluidic amplifier outlet ports in fluid communication with the valve bore,
a second fluid inlet port extending through the housing and coupling a second one of the fluidic amplifier outlet ports in fluid communication with the valve bore,
a first fluid outlet port extending through the housing and in fluid communication with the valve bore first end,
a second fluid outlet port extending through the housing and in fluid communication with the valve bore second end, and
a valve element freely disposed within the valve bore and translationally moveable between at least (i) a first position, in which the valve element substantially seals the first fluid outlet port, and (ii) a second position, in which the valve element substantially seals the second fluid outlet port,
wherein the valve bore first and second ends each have a first cross sectional area, and at least a section of the valve bore inner surface between the valve bore first and second ends has a second cross sectional area that is greater than the first cross sectional area;
wherein the second cross-sectional area comprises a clearance cut in a flow splitter.

13. The valve of claim 12, wherein said clearance cut is:
a groove formed in the valve bore inner surface and at least partially surrounding the valve bore, to thereby form the valve bore inner surface section that has the second cross sectional area.

14. The valve of claim 12, further comprising:
a first seat surface formed in the valve bore first end; and
a second seat surface formed in the valve bore second end,
wherein the valve element seats against the first seat surface when in the first position, and against the second seat surface when in the second position.

15. The valve of claim 14, wherein each seat surface has a maximum cross sectional area that is less than the first cross sectional area.

16. The valve of claim 14, wherein the valve element is substantially sphere-shaped.

17. The valve of claim 16, wherein:
the first and second seat surfaces are at least partially sphere-shaped; and
the valve bore is substantially cylinder-shaped.

18. The valve of claim 12, wherein the first and second fluid outlet ports are positioned substantially opposite one another.

19. The valve of claim 12, wherein the housing comprises a metal selected from the group consisting of Inconel, ceramic, and Titanium Zirconium Molybdenum.

20. The valve of claim 19, wherein the housing further comprises rhenium.

21. The valve of claim 12, wherein the valve element comprises silicon nitride.

22. The valve of claim 12, wherein the valve element comprises graphite coated with a layer of rhenium.

23. A flight control system, comprising:
a controller operable to supply flight control signals;
a hot gas generator operable to supply a flow of hot pressurized gas;
one or more fluidic amplifier stages coupled to receive the flow of hot pressurized gas from the gas generator and responsive to the flight control signals to selectively divert at least a portion of the received flow of hot pressurized gas into one of at least two amplifier stage outlet ports;
at least two discharge nozzles; and
a fluidic diverter valve fluidly connected to said one of said one or more fluidic amplifier stages including:
a housing having an inner surface that forms a valve bore therein, the valve bore including a first end and a second end,
a first fluid inlet port extending through the housing and coupling a first one of the fluidic amplifier fluid outlet ports in fluid communication with the valve bore,
a second fluid inlet port extending through the housing and coupling a second one of the fluidic amplifier fluid outlet ports in fluid communication with the valve bore,
a first fluid outlet port extending through the housing and coupling a first one of the discharge nozzles in fluid communication with the valve bore,
a second fluid outlet port extending through the housing and coupling a second one of the discharge nozzles in fluid communication with the valve bore, and
a valve element freely disposed within the valve bore and translationally moveable, in response to hot pressurized fluid flow through the inlet ports, between at least (i) a first position, in which the valve element substantially seals the fluidic diverter valve first fluid outlet port, and (ii) a second position, in which the valve element substantially seals the fluidic diverter valve second fluid outlet port,
wherein the valve bore first and second ends each have a first cross sectional area, and at least a section of the valve bore inner surface, between the valve bore first and second ends, has a second cross sectional area that is greater than the first cross sectional area;
wherein the second cross-sectional area comprises a clearance cut in a flow splitter.

* * * * *